United States Patent [19]

Mosbacher et al.

[11] 4,043,021
[45] Aug. 23, 1977

[54] PROCESS FOR MAKING SHEET-METAL PLANET CARRIER

[75] Inventors: Rudolf Mosbacher, Mariabrunn; Hans Ruppik, Friedrichshafen, both of Germany

[73] Assignee: Zahnradfabrik Friedrichshafen Aktiengesellschaft, Friedrichshafen, Germany

[21] Appl. No.: 653,001

[22] Filed: Jan. 28, 1976

[30] Foreign Application Priority Data

Jan. 29, 1975 Germany .............................. 2503518

[51] Int. Cl.² ............................................. B23P 11/00
[52] U.S. Cl. ...................................... 29/437; 29/522; 74/750 R
[58] Field of Search ..................... 29/159.2, 522, 509, 29/437; 74/750 R, 606 R, 449, 801

[56] References Cited

U.S. PATENT DOCUMENTS

| 2,601,151 | 6/1952 | Keller | 74/750 R X |
| 3,058,211 | 10/1962 | Axtell | 29/522 X |
| 3,059,491 | 10/1962 | Hoff et al. | 74/449 X |
| 3,527,121 | 9/1970 | Moore | 74/801 X |
| 3,780,601 | 12/1973 | Dach et al. | 74/750 R X |
| 3,842,481 | 10/1974 | Laing | 29/159.2 X |

Primary Examiner—Charlie T. Moon
Attorney, Agent, or Firm—Karl F. Ross; Herbert Dubno

[57] ABSTRACT

A planet carrier for an epicyclic gear train comprises two parallel sheet-metal disks of different diameters with coaxial central apertures for the insertion of a sun gear. The larger disk is formed with peripheral teeth and with a plurality of arcuate slots as well as several mounting holes between its periphery and its central aperture. The smaller disk has mounting holes aligned with those of the larger disk and is integral with a plurality of spider legs whose extremities are received in the arcuate slots of that larger disk and are welded thereto. The aligned mounting holes, each pair of which is designed to receive the shaft of a respective planet pinion, are each provided with two diametrically opposite notches into which the corresponding shaft end is tamped to wedge the shaft firmly in position. The notches are formed by punching, concurrently with the stamping of the respective disk from a sheet-metal blank.

1 Claim, 3 Drawing Figures

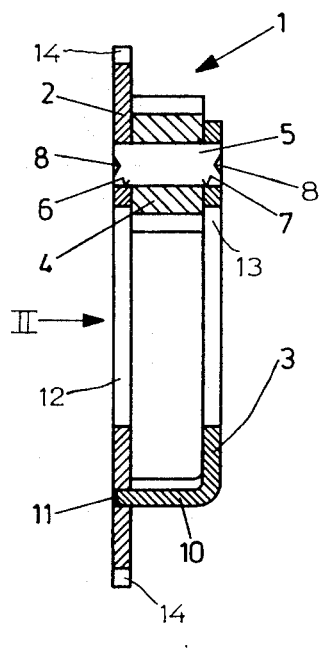
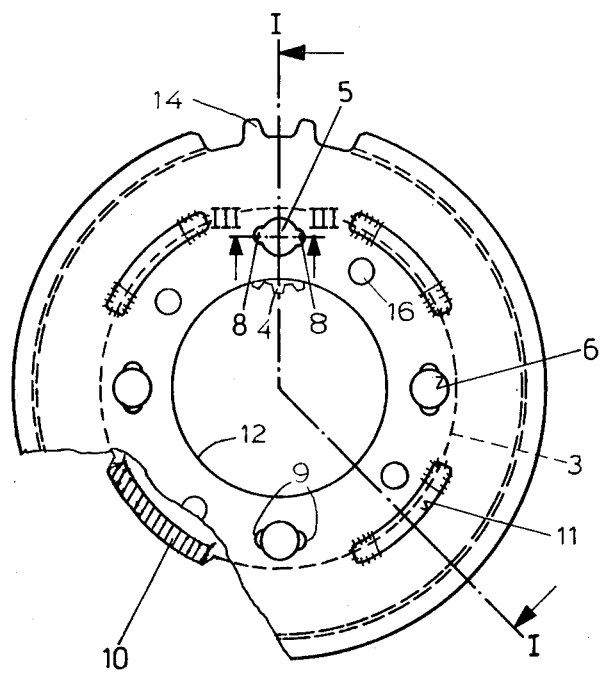
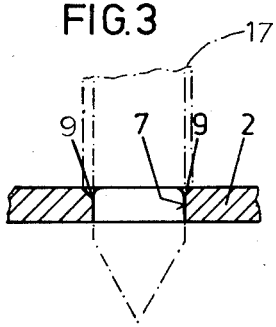

PROCESS FOR MAKING SHEET-METAL PLANET CARRIER

FIELD OF THE INVENTION

Our present invention relates to a process for manufacturing a planet carrier for an epicyclic gear train, e.g. as used in automotive transmission systems.

BACKGROUND OF THE INVENTION

Such an epicyclic gear train generally consists of three basic components, namely a sun gear on a central shaft, a ring gear concentrically surrounding the sun gear, and a carrier for one or more planet pinions in mesh with the sun and ring gears. By selectively coupling these three components to a drive shaft, a load shaft and a brake, different speed ratios can be established between the drive and load shafts.

In order to avoid eccentric stresses, it is generally desirable to mount at least two and preferably three or four planet pinions on the carrier in a symmetrical manner, advantageously with the aid of stub shafts which are fixedly secured to the carrier and on which the pinions are freely rotatable. A convenient support for these stub shafts comprises a pair of parallel disks forming part of the carrier body, the disks being provided with pairs of mutually aligned mounting holes for the shaft ends. The disks usually consist of sheet metal and are permanently secured to each other, as by welding, with just enough spacing to receive the planet pinions. In order to fix the stub shafts in position upon completion of the assembly, incisions may be cut on a milling machine into the peripheries of the preformed mounting holes whereupon the ends of the inserted shafts may be deformed by peening so that portions thereof are extruded into these incisions to secure the shaft against rotation. The formation of the incisions in a separate milling operation is, however, cumbersome and expensive.

OBJECT OF THE INVENTION

The object of our present invention, therefore, is to provide an improved process for making such a planet carrier and, in particular, for shaping its mounting holes in a way avoiding the aforestated drawback.

SUMMARY OF THE INVENTION

We realize this object, in accordance with our present invention, by punching each mounting hole with a generally circular outline and at least one peripheral notch in a single operation, preferably together with the stamping of the entire disk from a sheet-metal blank. The notch or notches so formed extend, advantageously, to a depth substantially less than the thickness of the respective disk so that the shaft end remains in positive all-around contact with the surrounding disk material and is firmly wedged in place upon being tamped to expand into the notch or notches.

BRIEF DESCRIPTION OF THE DRAWING

The above and other features of our invention will now be described in detail with reference to the accompanying drawing in which:

FIG. 1 is a cross-sectional view of a planet carrier according to our invention, taken on the line I—I of FIG. 2;

FIG. 2 is a face view of the carrier as seen in the direction of arrow II of FIG. 1; and FIG. 3 is a fragmentary sectional view taken on the line III—III of FIG. 2.

SPECIFIC DESCRIPTION

In FIGS. 1 and 2 we have shown a planet carrier 1 consisting essentially of a pair of parallel disks 2, 3 with large central apertures 12 and 13 accommodating a nonillustrated sun gear, the larger disk 2 being provided with peripheral teeth 14 enabling the carrier to be driven or arrested by external means not shown. The smaller disk 3 terminates in a set of spider legs 10 whose arcuate cross-sections conform to the shape of respective segmental slots 11 in disk 2; the extremities of the spider legs 10 are received in these slots and welded thereto. This mode of interconnection of the two disks is the subject matter of commonly owned application Ser. No. 650,005 filed on even date herewith by one of us, Rudolf Mosbacher, and does not form part of our present invention.

Disks 2 and 3 are also provided with respective mounting holes 6 and 7 confronting each other across an intervening space which is reserved for the introduction of planet pinions 4 (only one shown). The mounting holes 6 and 7 are disposed between the slots 11 in such a way that the pinions 4 will stand clear of the legs 10 while projecting inwardly past the circumferences of apertures 12, 13 and outwardly beyond the perimeter of disk 3. Other pairs of aligned holes 16, of smaller diameter, may be used to accommodate stay bolts designed to reinforce the cage structure formed by the two disks.

Each disk is produced by stamping from a sheet-metal blank by means of a suitable die, not shown, which also includes tools for punching the slots 11 and the holes 6 (or 7) and 16. One such tool has been diagrammatically illustrated at 17 in FIG. 3 and is seen to have a pair of lateral ribs designed to form diametrically opposite notches 9 in the periphery of each mounting hole 6 or 7. Each pinion 4 has a stub shaft 5 whose ends, upon insertion into the mounting holes and through the pinion as shown in FIG. 1, are tamped so that portions 8 thereof are forced into the notches 9 whereby the shaft is tightly wedged against rotation and axial displacement. Sufficient play is, of course, provided between the two disks to enable free rotation of the pinions, e.g. by the interposition of spacer blocks during the welding operation as described in the commonly owned Mosbacher application referred to above.

As clearly shown in FIG. 3, the depth of the notches 9 is a minor fraction of the thickness of the corresponding disk (here disk 2). No separate machining or chip-removing operation is needed in the formation of these notches.

We claim:

1. A process for manufacturing a planet carrier for an epicyclic gear train, comprising the steps of :
   stamping two sheet-metal disks, each having a central aperture, from sheet-metal blanks;
   punching , simultaneously with the stamping step, a plurality of generally circular mounting holes in each of said disks around the central aperture thereof;
   accompanying the punching of said holes by a partial penetration of said blanks with formation of at least one peripheral notch adjacent each mounting hole;
   assembling said disks parallel to each other into a unitary body with their central apertures coaxially disposed and with their mounting holes aligned;
   interposing a planet pinion between said disks in line with each pair of aligned mounting holes;
   passing a shaft through each pair of aligned mounting holes and the interposed planet pinion; and
   deforming the ends of said shaft to extrude portions thereof into said notches whereby said shaft is firmly anchored to said body.

* * * * *